United States Patent [19]

Kudo

[11] Patent Number: 4,493,536
[45] Date of Patent: Jan. 15, 1985

[54] INVERTED TELEPHOTO TYPE LENS SYSTEM

[75] Inventor: Yoshinobu Kudo, Osaka, Japan

[73] Assignee: Minolta Camera Kabushiki Kaisha, Osaka, Japan

[21] Appl. No.: 362,031

[22] Filed: Mar. 25, 1982

[30] Foreign Application Priority Data

Mar. 31, 1981 [JP] Japan ................. 56-48684

[51] Int. Cl.$^3$ .................... G02B 9/60; G02B 13/04
[52] U.S. Cl. ........................................... 350/462
[58] Field of Search ............................. 350/462

[56] References Cited

U.S. PATENT DOCUMENTS

| 3,731,989 | 5/1973 | Shimizu | 350/462 |
| 3,936,153 | 2/1976 | Ogura | 350/462 |
| 4,203,653 | 5/1980 | Mori | 350/462 |

FOREIGN PATENT DOCUMENTS

| 0024194 | 7/1971 | Japan . |
| 0056625 | 5/1976 | Japan . |
| 0075440 | 6/1976 | Japan . |
| 0131718 | 11/1977 | Japan . |
| 0059418 | 5/1978 | Japan . |
| 0147607 | 11/1980 | Japan . |

*Primary Examiner*—John K. Corbin
*Assistant Examiner*—Rebecca D. Gass
*Attorney, Agent, or Firm*—Jackson, Jones & Price

[57] ABSTRACT

An improved 5-component, 5-lens element inverted telephoto objective lens system is provided comprising from object to image side of a negative meniscus single lens element, a biconvex single lens element, a biconcave single lens element, a positive meniscus single lens element and a positive single lens element. The lens system fulfills the following conditions:

(1) $N_1 > 1.69$
(2) $0.72(d_6 + d_7 + d_8 + d_9) < d_5 < 2.2(d_6 + d_7 + d_8 + d_9)$
(3) $0.26 f < d_4 < 0.43 f$
(4) $0.14 f < d_5 < 0.3 f$
(5) $1.51 f < f_2 + |f_3| < 2.2 f$
(6) $0.12 f < d_3 < 0.4 f$
(7) $0.92 f < r_3 < 2.0 f$
(8) $1.71 f < -r_4 < 4.0 f$

7 Claims, 16 Drawing Figures

Spherical Aberration
Sine Condition

Astigmatism

Distortion

FIG.3
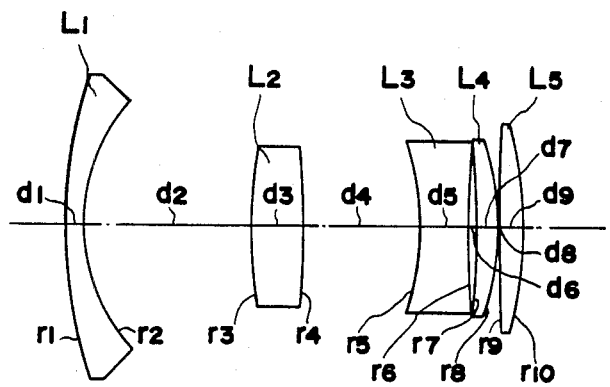
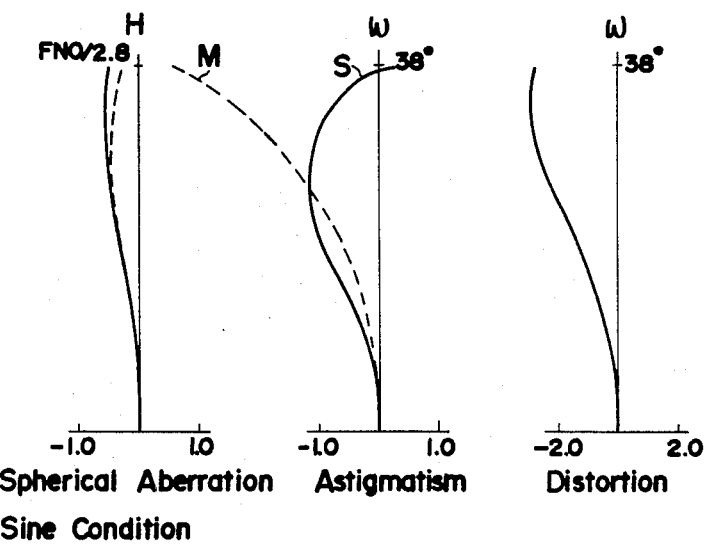
FIG.4a — Spherical Aberration / Sine Condition
FIG.4b — Astigmatism
FIG.4c — Distortion FIG.5
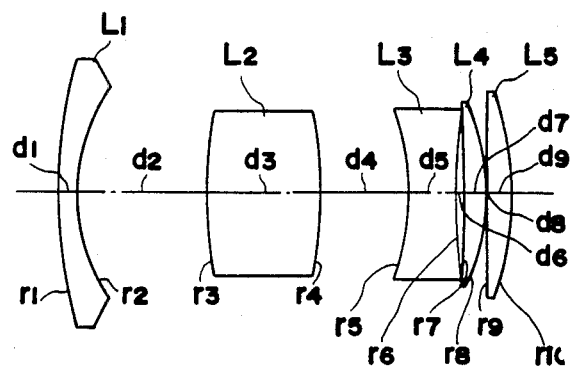
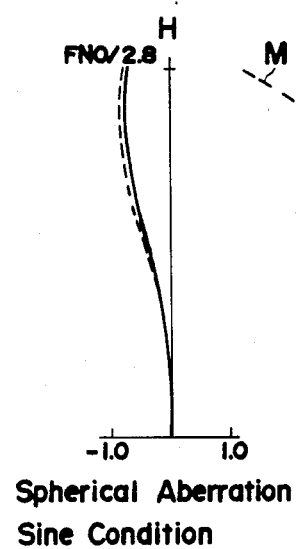
FIG.6a
Spherical Aberration
Sine Condition
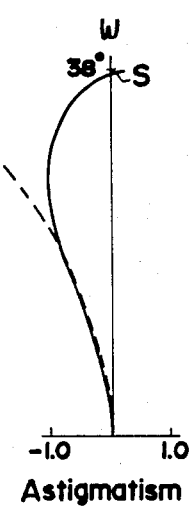
FIG.6b
Astigmatism
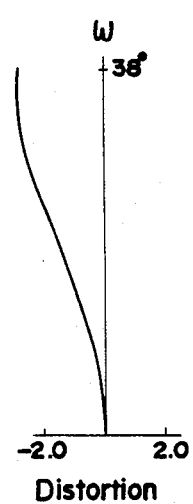
FIG.6c
Distortion Spherical Aberration
Sine Condition Astigmatism Distortion

INVERTED TELEPHOTO TYPE LENS SYSTEM

BACKGROUND OF THE INVENTION

1. Field of the Invention

The present invention relates to an objective lens system for use in a single lens reflex camera, and more particularly to an inverted telephoto objective lens system of a 5-component, 5-lens element type.

2. Description of the Prior Art

Various inverted telephoto type lens systems of a 5-component, 5-lens element construction have been provided as wide angle objective lens systems for use with single lens reflex cameras. These lens systems are known from an optical designer viewpoint, as the simplest construction of lenses. Generally, they consist of, from the object side, a first negative lens, a second positive lens, third negative lens, a fourth positive lens and a fifth positive lens. An example of such a lens can be found in U.S. Pat. No. 3,936,153 which proposes an inverted telephoto type lens system of a 5-component, 5-lens element design which has a field angle of 64°, an aperture ratio of 1/2.8, a back focal distance of approximately the focal length of the whole lens system and a good image forming capability which is at least equal to or better than that of the conventional inverted telephoto-type lens system comprising six or seven lenses.

Other examples of prior art can be found in U.S. Pat. No. 3,731,989, U.S. Pat. No. 4,203,653, Japanese Laid Open Patent Applications Nos. 51-56625, 51-75440, 52-131718, 53-59418, and 55-147607 and finally in Japanese Patent Publication No. 46-24194.

However, in a wide angle objective lens system consisting of a few lens elements such as a 5-component, 5-element-type, it becomes increasingly difficult to maintain both a desired aperture ratio and good image forming capability in direct proportion to the increase in the field angle and in the back focal distance.

Thus, the prior art is still seeking to provide a simplified lens construction with improved performance capabilities.

SUMMARY OF THE INVENTION

An object of the present invention is to provide an inverted telephoto type lens system having a field angle of approximatly 76°, a back focal distance longer than 1.2 times the focal length of the whole lens system, an aperture ratio of approximately 1/2.8 and good image forming capability.

Another object of the present invention is to provide an inverted telephoto type lens system while maintaining a compact configuration.

The present invention can be further defined as including a first negative meniscus single lens element, convex to the object side; a second biconvex single lens element; a third biconcave single lens element; a fourth positive meniscus single lens element convex to the image side and a fifth positive single lens element. The lens system can fulfill some or all of the following conditions:

| | |
|---|---|
| (1) | $N_1 > 1.68$ |
| (2) | $0.67(d_6 + d_7 + d_8 + d_9) < d_5 < 2.2(d_6 + d_7 + d_8 + d_9)$ |
| (3) | $0.26 f < d_4 < 0.43 f$ |
| (4) | $0.13 f < d_5 < 0.3 f$ |
| (5) | $1.51 f < f_2 + |f_3| < 2.2 f$ |
| (6) | $0.12 f < d_3 < 0.4 f$ |
| (7) | $0.92 f < r_3 < 2.0 f$ |
| (8) | $1.71 f < -r_4 < 4.0 f$ | wherein;

$N_1$ represents the refractive index of the glass material of the first component;

$d_i$ represents the i-th axial distance counted from the object side;

$f_2$ represents the focal length of the second component;

$f_3$ represents the focal length of the third component;

$r_3, r_4$ represent the radii of curvature of the third and fourth surfaces numbered from the object side, respectively, and f represents the focal length of the whole lens system.

The objects and features of the present invention which are believed to be novel are set forth with particularity in the appendant claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 3 represents a schematic cross sectional view of a second embodiment of the present invention;

FIGS. 4a, 4b, and 4c represent graphic plots of the aberrations of the second embodiment;

FIG. 5 represents a schematic cross sectional view of a third embodiment of the present invention;

FIGS. 6a, 6b and 6c represent graphic plots of the aberrations of the third embodiment;

DETAILED DESCRIPTION OF THE PREFERRED EMBODIMENTS

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide an inverted telephoto-type lens system.

The derivation of the specific parameters of the lens embodiments disclosed herein can be accomplished with the assistance of a compromised balance of acceptable aberrations in a relatively easily manufactured lens assembly that is particularly suited for a single lines reflex camera. The data presented herein in the tables, to be discussed subsequently, are more than adequate to permit a competent artisan in the optical art to reproduce the embodiments of the present invention.

In the accompanying drawings, which supplement the following tables, the lenses in accordance with the present invention are illustrated schematically. As usual, in conventional lens diagrams, the light is assumed to travel from left to right and the individual lens groups are designated by the letter, L, with a subscript indicating the position of the lenses as numbered consecutively from the object to image side.

The radius of curvature is indicated by letter, r, with a subscript corresponding to the consecutive surfaces of the lens elements from left to right. The axial spacings are designated with the letter, d, again with a subscript indicating the distance consecutive from the left to the right.

In the tables, the minus (−) signs indicate surfaces concave toward the object side, while the surfaces without a sign are convex toward the object side. The axial spacings will include both the thickness of the lens and the air spaces, and in this regard, the value of the axial spacing between the lens elements are appropriately positioned in the tables relative to the values of the radius of curvature to indicate whether the axial distance is an air space or a thickness of the lens. The tables also provide, with respect to each embodiment, the field angle $2\omega$, the F number, and the focal length. The refractive index is designated as N, while the Abbe number is $\nu$.

Figure 1:
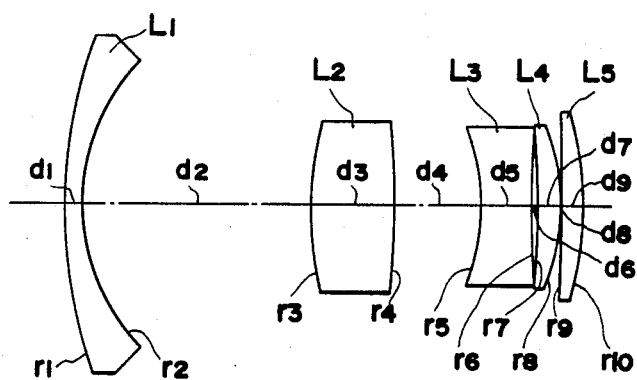
FIG. 1 represents a schematic cross sectional view of a first embodiment of the present invention.
Figure 2A:
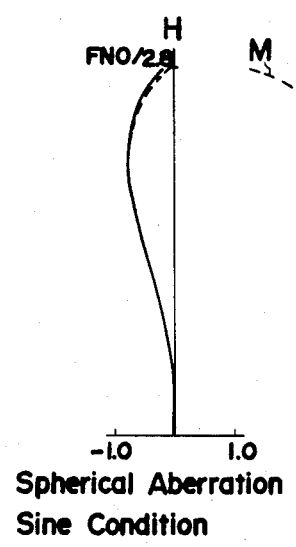
FIGS. 2a, 2b and 2c represent graphic plots of the aberrations of the first embodiment.
Figure 2B:
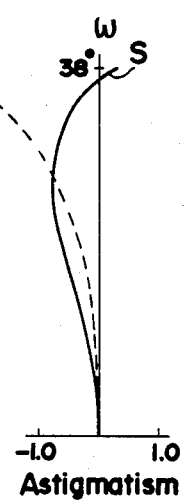
Figure 2C:
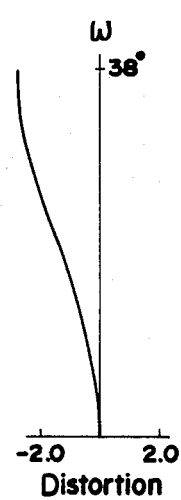
Figure 7:
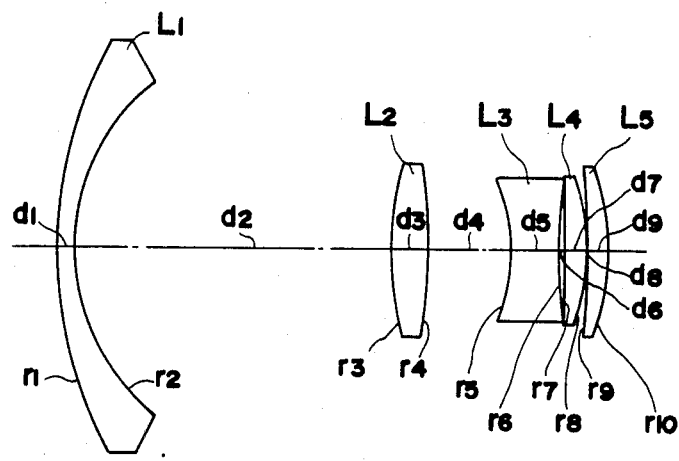
FIG. 7 represents a schematic cross sectional view of a fourth embodiment of the present invention.
Figure 8A:
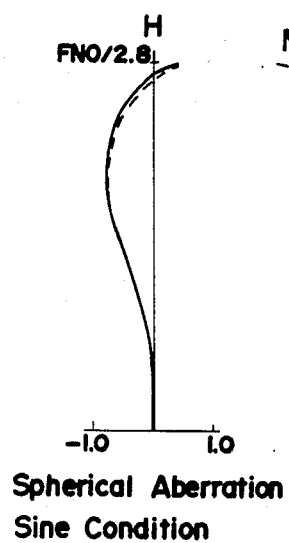
FIGS. 8a, 8b and 8c represent graphic plots of the aberrations of the fourth embodiment.
Figure 8B:
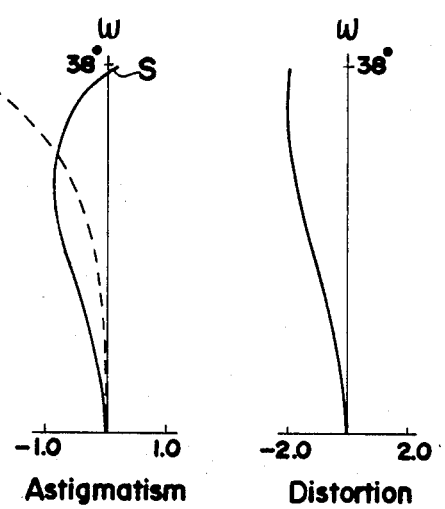
Figure 8C:
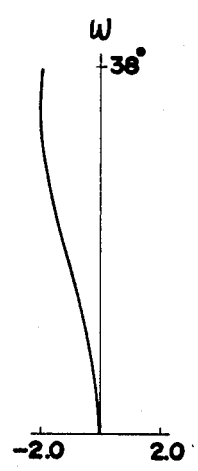

As shown in FIGS. 1, 3, 5 and 7, the present invention seeks to provide an inverted telephoto-type lens system of a 5-component, 5-lens element type comprising from the object to the image side; a first component consisting of a negative meniscus single lens element ($L_1$) convex to the object side; a second component consisting of a biconvex single lens element ($L_2$); a third component consisting of a biconcave single lens element ($L_3$); a fourth component consisting of a positive meniscus single lens element ($L_4$) convex to the image side and a fifth component consisting of a positive single lens element ($L_5$), wherein the lens system fulfills the following conditions:

| (1) | $N_1 > 1.69$ |
|---|---|
| (2) | $0.72(d_6 + d_7 + d_8 + d_9) < d_5 < 2.2(d_6 + d_7 + d_8 + d_9)$ |
| (3) | $0.26\,f < d_4 < 0.43\,f$ | wherein, $N_1$ represents the refractive index of the glass material of the first component;

$d_i$ represents the i-th axial distance countered from the object side; and f represents the focal length of the whole lens system.

A known inverted telephoto type lens system for use with a single lens reflex camera has incorporated a divergent lens group at the front of the whole lens system and a convergent lens group in the rear portion thereof. The principal design technique according to the present invention is to provide only the first single lens element ($L_1$) as the aforesaid divergent lens group. To achieve this purpose, the first single lens element ($L_1$) must have a relatively great negative power for providing the increased field angle and the increased back focal distance. The second to fifth lens elements ($L_2$)–($L_5$) are used as the aforesaid convergent lens group for correcting the aberrations created by the first lens element ($L_1$). More particularly, the third to fifth lens elements ($L_3$)–($L_5$) are placed close to each other with a considerable degree of thickness designed into the third lens element ($L_3$). The second lens element ($L_2$) is placed at a considerably great air distance apart from the third to fifth lens elements ($L_3$)–($L_5$).

In the above equations, condition (1) relates to the refractive index of the glass material of the first lens element ($L_1$) for obtaining both the increased field angle and the increased back focal distance. Compliance with condition (1) provides a relatively great negative power for the first lens element ($L_1$). If condition (1) is violated, it would become difficult to obtain the desired large field angle and the desired long back focal distance because of the diminished negative refractive power available to the first lens element ($L_1$).

Condition (2) represents the relationship between the thickness of the third lens element ($L_3$) and the distance between the third to fifth lens element ($L_3$)–($L_5$) for correcting the spherical aberration and the field curvature. When the lower limit of condition (2) is violated, the balance of the field curvature and the spherical aberration is destroyed due to an excessively increased Petzval Sum, since the field curvature would deteriorate with the appropriate spherical aberration; conversely, the correction of the field curvature would cause an increase of the spherical aberration. On the other hand, the compactness of the lens system would be lost since it is inevitably necessary to increase the total length of the lens system and the Petzval Sum would be increased undesirably, if the upper limit of condition (2) is violated.

Condition (3) defines the air distance, $d_4$, between the second lens element ($L_2$) and the third lens elements ($L_3$) for correcting the aberrations. If the lower limit of condition (3) is violated, the distortion aberration and the coma flare would be increased, since the effective function of a positive lens is excessively diminished in the second lens element ($L_2$). If the upper limit of condition (3) is violated, the spherical aberration would be in over-correction state and the coma flare would be increased.

Under conditions (1)–(3), a lens system according to the present invention has a good image forming capability with well corrected aberrations. In particular, the lens system according to the present invention is capable of improving the focal plane image contrast in a position of about 12–18 mm apart from the optical axis, if it is used for the objective lens of 35 mm. single lens reflex camera.

For the further correction of the aberrations, it is recommended to maintain the following conditions:

| (4) | $0.14\,f < d_5 < 0.3\,f$ |
|---|---|
| (5) | $1.51\,f < f_2 + |f_3| < 2.2\,f$ |
| (6) | $0.12\,f < d_3 < 0.4\,f$ |
| (7) | $0.92\,f < r_3 < 2.0\,f$ |
| (8) | $1.71\,f < -r_4 < 4.0\,f$ | wherein, $f_2$ represents the focal length of the second component;

$f_3$ represents the focal length of the third component, and $r_3$, $r_4$ represent the radii of curvature of the third and fourth surfaces numbered from the object side, respectively.

Condition (4) represents the relationship between the thickness of the third lens element ($L_3$) and the focal length of the whole lens system for correcting spherical aberration, field curvature and any distortion aberration. If the lower limit of condition (4) is violated, since the effective function as a negative lens is excessively diminished in the third lens element ($L_3$), a negative distortion aberration would be generally created and the correction of spherical aberration would deteriorate. If the upper limit of condition (4) is violated, since marginal rays of the whole lens system would be diminished without a corresponding change in the placements of the lens elements, the compactness of the lens system would be lost because of the increased diameter of each element for avoiding the above diminishment, and the aberrations on the sagittal image surface would be in an under corrected state.

Condition (5) defines the sum of the focal length of the second component and the absolute value of the focal length of the third component for correcting the field curvature. When the lower limit of condition (5) is violated because of any shortening of the length of the second component, the field curvature would be in an under-corrected state. When the lower limit of (5) is violated because of any shortening of the focal length of the third group, the field curvature would be in an over-corrected state. When the upper limit of condition (5) is violated, since both the convergent function of the second component and the divergent function of the third component would not be obtained sufficiently, it would be difficult to compensate for both spherical aberration and field curvature as well.

Conditions (6) to (8) relate to the configuration of the lens element in the second component for correcting the aberrations. Condition (6) defines the thickness of the second lens element for correcting the spherical aberration and the coma flare. If the lower limit of condition (6) is violated, since the convergent function of the second lens element is diminished excessively, the spherical aberration would be in an under-corrected state, and at the same time, negative coma flare would be created undesirably on the marginal image plane. If the upper limit of condition (6) is violated, the compactness of the lens system would be lost because of the increased diameters of the lens elements for keeping the desired quantity of light on the marginal image plane, although the aberration correction may be easier. Conditions (7) and (8) define the radius of curvature of the front and the rear surface in the second component, respectively. If the lower limit of condition (7) is violated, the spherical aberration would be in an under-corrected state and the correction of the negative distortion aberration would be difficult. If the upper limit of condition (7) is violated, the spherical aberration would be in an under-corrected state and excessive positive coma flare would be created on the image plane near the optical axis. If the lower limit of condition (8) is violated, the spherical aberration would be in an under-corrected condition and positive coma flare would be created undesirably on the image plane near the optical axis. If the upper limit of condition (8) is violated, undesirable negative distortion would be created and negative coma flare would be created easily on the image plane near the optical axis.

The following Tables 1-4 represent, respectively, four embodiments of the present invention.

TABLE 1

[Embodiment 1]
$f = 100$  $F_{No.}\ 2.8$  $2\omega = 76°$  L.B. = 127.68

| | Radius of Curvature | | Axial Distance | Refractive Index | Abbe Number |
|---|---|---|---|---|---|
| $r_1$ | 155.59 | $d_1$ | 5.99 | $N_1$ 1.78831 | $\nu_1$ 47.32 |
| $r_2$ | 64.39 | $d_2$ | 76.21 | | |
| $r_3$ | 108.09 | $d_3$ | 28.05 | $N_2$ 1.80500 | $\nu_2$ 44.53 |
| $r_4$ | −220.00 | $d_4$ | 29.02 | | |
| $r_5$ | −61.66 | $d_5$ | 15.51 | $N_3$ 1.75000 | $\nu_3$ 25.14 |
| $r_6$ | 214.66 | $d_6$ | 2.85 | | |
| $r_7$ | −283.61 | $d_7$ | 7.43 | $N_4$ 1.77250 | $\nu_4$ 49.77 |
| $r_8$ | −67.86 | $d_8$ | 0.30 | | |
| $r_9$ | −1780.44 | $d_9$ | 7.42 | $N_5$ 1.69680 | $\nu_5$ 56.47 |
| $r_{10}$ | −110.34 | | | | |

$\Sigma d$ 172.78
$d_5/(d_6 + d_7 + d_8 + d_9) = 0.862$
$d_4 = 0.290\ f$
$d_5 = 0.16\ f$
$f_2 + |f_3| = 1.56\ f$

TABLE 2

[Embodiment 2]
$f = 100$  $F_{No.}\ 2.8$  $2\omega = 76°$  L.B. = 127.75

| | Radius of Curvature | | Axial Distance | Refractive Index | Abbe Number |
|---|---|---|---|---|---|
| $r_1$ | 158.04 | $d_1$ | 5.89 | $N_1$ 1.69680 | $\nu_1$ 55.52 |
| $r_2$ | 59.26 | $d_2$ | 55.55 | | |
| $r_3$ | 139.34 | $d_3$ | 17.28 | $N_2$ 1.81100 | $\nu_2$ 44.86 |
| $r_4$ | −233.02 | $d_4$ | 39.89 | | |
| $r_5$ | −73.88 | $d_5$ | 15.81 | $N_3$ 1.75000 | $\nu_3$ 25.14 |
| $r_6$ | 265.81 | $d_6$ | 2.80 | | |
| $r_7$ | −252.01 | $d_7$ | 7.51 | $N_4$ 1.77250 | $\nu_4$ 49.77 |
| $r_8$ | −73.90 | $d_8$ | 0.30 | | |
| $r_9$ | 724.23 | $d_9$ | 7.86 | $N_5$ 1.75450 | $\nu_5$ 51.57 |
| $r_{10}$ | −114.90 | | | | |

$\Sigma d$ 152.89
$d_5/(d_6 + d_7 + d_8 + d_9) = 0.856$
$d_4 = 0.399\ f$
$d_5 = 0.16\ f$
$f_2 + |f_3| = 1.85\ f$

TABLE 3

[Embodiment 3]
$f = 100$  $F_{No.}\ 2.8$  $2\omega = 76°$  L.B. = 129.07

| | Radius of Curvature | | Axial Distance | Refractive Index | Abbe Number |
|---|---|---|---|---|---|
| $r_1$ | 158.67 | $d_1$ | 6.11 | $N_1$ 1.82050 | $\nu_1$ 43.00 |
| $r_2$ | 54.80 | $d_2$ | 42.30 | | |
| $r_3$ | 120.47 | $d_3$ | 38.00 | $N_2$ 1.87800 | $\nu_2$ 38.14 |
| $r_4$ | −172.17 | $d_4$ | 29.65 | | |
| $r_5$ | −70.83 | $d_5$ | 15.81 | $N_3$ 1.75000 | $\nu_3$ 25.14 |
| $r_6$ | 198.71 | $d_6$ | 3.10 | | |
| $r_7$ | −265.57 | $d_7$ | 7.00 | $N_4$ 1.72900 | $\nu_4$ 53.48 |
| $r_8$ | −75.64 | $d_8$ | 0.30 | | |
| $r_9$ | 4152.30 | $d_9$ | 8.49 | $N_5$ 1.72000 | $\nu_5$ 54.71 |
| $r_{10}$ | −91.58 | | | | |

$\Sigma d$ 150.76
$d_5/(d_6 + d_7 + d_8 + d_9) = 0.837$
$d_4 = 0.297\ f$
$d_5 = 0.16\ f$
$f_2 + |f_3| = 1.54\ f$

TABLE 4

[Embodiment 4]
$f = 100$  $F_{No.}\ 2.8$  $2\omega = 76°$  L.B. = 128.01

| | Radius of Curvature | | Axial Distance | Refractive Index | Abbe Number |
|---|---|---|---|---|---|
| $r_1$ | 138.10 | $d_1$ | 6.00 | $N_1$ 1.77250 | $\nu_1$ 49.77 |
| $r_2$ | 70.41 | $d_2$ | 105.01 | | |
| $r_3$ | 109.06 | $d_3$ | 11.69 | $N_2$ 1.85000 | $\nu_2$ 40.51 |
| $r_4$ | −301.43 | $d_4$ | 28.12 | | |
| $r_5$ | −62.93 | $d_5$ | 15.91 | $N_3$ 1.80518 | $\nu_3$ 25.43 |
| $r_6$ | 184.62 | $d_6$ | 2.00 | | |
| $r_7$ | −597.88 | $d_7$ | 7.41 | $N_4$ 1.80100 | $\nu_4$ 46.54 |
| $r_8$ | −70.68 | $d_8$ | 0.30 | | |
| $r_9$ | −217.62 | $d_9$ | 6.97 | $N_5$ 1.77250 | $\nu_5$ 49.77 |
| $r_{10}$ | −88.68 | | | | |

$\Sigma d$ 183.41
$d_5/(d_6 + d_7 + d_8 + d_9) = 0.954$

TABLE 4-continued

[Embodiment 4]

f = 100    $F_{No.}$ 2.8    $2\omega = 76°$    L.B. = 128.01

| Radius of Curvature | Axial Distance | Refractive Index | Abbe Number |
|---|---|---|---|
| | $d_4 = 0.281\ f$ | | |
| | $d_5 = 0.16\ f$ | | |
| | $f_2 + |f_3| = 1.522\ f$ | | |

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

What is claimed is:

1. An inverted telephoto lens system of a 5-component, 5-element type, comprising from the object to the image side:
   a first component consisting of a negative meniscus single lens element convex to the object side;
   a second component consisting of a biconvex single lens element;
   a third component consisting of a biconcave single lens element;
   a fourth component consisting of a positive meniscus single lens element convex to the image side; and
   a fifth component consisting of a positive single lens element, wherein the lens system fulfills the following conditions:

$N_1 > 1.69$
$0.72(d_6 + d_7 + d_8 + d_9) < d_5 < 2.2(d_6 + d_7 + d_8 + d_9)$
$0.14\ f < d_5 < 0.3\ f$
$0.26\ f < d_4 < 0.43\ f$
$0.12\ f < d_3 < 0.4\ f$ wherein:
$N_1$ represents the refractive index of the material of the first component;
$d_i$ represents the i-th axial distance counted from the object side; and
f represents the focal length of the whole lens system.

2. The invention of claim 1, wherein the lens system further fulfills the following condition:

$1.51f < f_2 + |f_3| < 2.2f$ wherein:
f represents the focal length of the whole lens system;
$f_2$ represents the focal length of the second component, and
$f_3$ represents the focal length of the third component.

3. The invention of claim 2, wherein the lens system further fulfills the following conditions:

$0.92f < r_3 < 2.0f$ $1.71f < -r_4 < 4.0f$ wherein:
f represents the focal length of the whole lens system; and
$r_3$, $r_4$ represents the radii of curvature of the third and fourth surface numbered from the object side, respectively.

4. An inverted telephoto lens system comprising the following arrangement and construction:

f = 100    $F_{No.}$ 2.8    $2\omega = 76°$    L.B. = 127.68

| Radius of Curvature | Axial Distance | Refractive Index | Abbe Number |
|---|---|---|---|
| $r_1$ 155.59 | $d_1$ 5.99 | $N_1$ 1.78831 | $v_1$ 47.32 |
| $r_2$ 64.39 | $d_2$ 76.21 | | |
| $r_3$ 108.09 | $d_3$ 28.05 | $N_2$ 1.80500 | $v_2$ 44.53. |
| $r_4$ −220.00 | $d_4$ 29.02 | | |
| $r_5$ −61.66 | $d_5$ 15.51 | $N_3$ 1.75000 | $v_3$ 25.14 |
| $r_6$ 214.66 | $d_6$ 2.85 | | |
| $r_7$ −83.61 | $d_7$ 7.43 | $N_4$ 1.77250 | $v_4$ 49.77 |
| $r_8$ −67.86 | $d_8$ 0.30 | | |
| $r_9$ −1780.44 | $d_9$ 7.42 | $N_5$ 1.69680 | $v_5$ 56.47 |
| $r_{10}$ −110.34 | | | |

5. An inverted telephoto lens system comprising the following arrangement and construction:

f = 100    $F_{No.}$ 2.8    $2\omega = 76°$    L.B. = 127.75

| Radius of Curvature | Axial Distance | Refractive Index | Abbe Number |
|---|---|---|---|
| $r_1$ 158.04 | $d_1$ 5.89 | $N_1$ 1.69680 | $v_1$ 55.52 |
| $r_2$ 59.26 | $d_2$ 55.55 | | |
| $r_3$ 139.34 | $d_3$ 17.28 | $N_2$ 1.81100 | $v_2$ 44.86 |
| $r_4$ −233.02 | $d_4$ 39.89 | | |
| $r_5$ −73.88 | $d_5$ 15.81 | $N_3$ 1.75000 | $v_3$ 25.14 |
| $r_6$ 265.81 | $d_6$ 2.80 | | |
| $r_7$ −252.01 | $d_7$ 7.51 | $N_4$ 1.77250 | $v_4$ 49.77 |
| $r_8$ −73.90 | $d_8$ 0.30 | | |
| $r_9$ 724.23 | $d_9$ 7.86 | $N_5$ 1.75450 | $v_5$ 51.57 |
| $r_{10}$ −114.90 | | | |

6. An inverted telephoto lens system comprising the following arrangement and construction:

f = 100    $F_{No.}$ 2.8    $2\omega = 76°$    L.B. = 129.07

| Radius of Curvature | Axial Distance | Refractive Index | Abbe Number |
|---|---|---|---|
| $r_1$ 158.67 | $d_1$ 6.11 | $N_1$ 1.82050 | $v_1$ 43.00 |
| $r_2$ 54.80 | $d_2$ 42.30 | | |
| $r_3$ 120.47 | $d_3$ 38.00 | $N_2$ 1.87800 | $v_2$ 38.14 |
| $r_4$ −172.17 | $d_4$ 29.65 | | |
| $r_5$ −70.83 | $d_5$ 15.81 | $N_3$ 1.75000 | $v_3$ 25.14 |
| $r_6$ 198.71 | $d_6$ 3.10 | | |
| $r_7$ −265.57 | $d_7$ 7.00 | $N_4$ 1.72900 | $v_4$ 53.48 |
| $r_8$ −75.64 | $d_8$ 0.30 | | |
| $r_9$ 4152.30 | $d_9$ 8.49 | $N_5$ 1.72000 | $v_5$ 54.71 |
| $r_{10}$ −91.58 | | | |

7. An inverted telephoto lens system comprising the following arrangement and construction:

f = 100    $F_{No.}$ 2.8    $2\omega = 76°$    L.B. = 128.01

| Radius of Curvature | Axial Distance | Refractive Index | Abbe Number |
|---|---|---|---|
| $r_1$ 138.10 | $d_1$ 6.00 | $N_1$ 1.77250 | $v_1$ 49.77 |
| $r_2$ 70.41 | $d_2$ 105.01 | | |
| $r_3$ 109.06 | $d_3$ 11.69 | $N_2$ 1.85000 | $v_2$ 40.51 |
| $r_4$ −301.43 | $d_4$ 28.12 | | |
| $r_5$ −62.93 | $d_5$ 15.91 | $N_3$ 1.80518 | $v_3$ 25.43 |
| $r_6$ 184.62 | $d_6$ 2.00 | | |
| $r_7$ −597.88 | $d_7$ 7.41 | $N_4$ 1.80100 | $v_4$ 46.54 |
| $r_8$ −70.68 | $d_8$ 0.30 | | |
| $r_9$ −217.62 | $d_9$ 6.97 | $N_5$ 1.77250 | $v_5$ 49.77 |
| $r_{10}$ −88.68 | | | |

* * * * *